United States Patent [19]
Snaith et al.

[11] Patent Number: 5,169,110
[45] Date of Patent: Dec. 8, 1992

[54] FORCE-DAMPING ENERGY-REMOVING ISOLATOR

[75] Inventors: Raymond E. Snaith, Jericho; Max Barrasso, Merrick, both of N.Y.

[73] Assignee: Aeroflex International Incorporated, P.R.

[21] Appl. No.: 732,481

[22] Filed: Jul. 18, 1991

[51] Int. Cl.$^5$ ............................................. E16M 13/00
[52] U.S. Cl. ................... 248/570; 248/619; 248/626; 248/636; 267/148
[58] Field of Search ............ 248/570, 618, 626, 628, 248/636, 638, 901; 165/69; 267/140.3, 148

[56] References Cited

U.S. PATENT DOCUMENTS

| | | | |
|---|---|---|---|
| 2,154,275 | 4/1939 | Linn | 248/618 |
| 3,039,725 | 6/1962 | Kerley, Jr. | 248/570 |
| 3,044,759 | 7/1962 | Kerley, Jr. | 248/570 |
| 3,204,913 | 9/1965 | Lawrence et al. | 267/148 X |
| 3,351,307 | 11/1967 | Michel et al. | 267/148 X |
| 3,360,225 | 12/1967 | Camossi | 267/148 |
| 3,596,865 | 8/1971 | Camossi | 267/148 X |
| 4,190,227 | 2/1980 | Belfield et al. | 248/618 X |
| 4,736,932 | 4/1988 | Haslin | 248/626 X |
| 4,783,038 | 11/1988 | Gilbert et al. | 248/570 |
| 4,789,023 | 12/1988 | Grant | 248/901 X |
| 4,854,556 | 8/1989 | Pietrzak | 248/570 X |
| 4,942,075 | 7/1990 | Härtel et al. | 267/148 X |
| 5,062,507 | 11/1991 | Roche | 248/570 X |

Primary Examiner—Carl D. Friedman
Assistant Examiner—Derek J. Berger
Attorney, Agent, or Firm—Rosenman & Colin

[57] ABSTRACT

An isolator includes flexural elements for resisting transmission of shock and vibration forces between structures, and also includes conductor elements for conducting energy such as heat and/or electricity from at least one of the structures. Each element spans the distance between a pair of isolator supports connected to the structures.

14 Claims, 3 Drawing Sheets

FORCE-DAMPING ENERGY-REMOVING ISOLATOR

BACKGROUND OF THE INVENTION

1. Field of the Invention

This invention generally relates to an isolator for resisting transmission of shock and vibration forces between structures and, more particularly, to a compact isolator also operative for conducting energy such as heat and/or electricity away from at least one of the structures that emits such energy.

2. Description of Related Art

Isolators for protecting a mounted item or load structure, such as an equipment cabinet, from shock and vibration forces exerted by another structure, such as a moving vehicle, are well known and have been used in many industrial and military applications. For example, U.S. Pat. Nos. 4,190,227 and 4,783,038 disclose such isolators where such forces are damped by flexural elements constituted of single- or multiple-strand metal wire such as stainless steel wire. Such stainless steel wires flex and readily return to their original state and, hence, are very effective for isolating the load structure from shock and vibration forces.

However, such stainless steel wires are much less effective in dissipating heat from load structures that generate heat during operation. For example, the load structure may be an electric motor, a transistorized or other electronic equipment, or an electro-mechanical apparatus, any one of which generates heat during operation. The efficient performance of such load structures is strongly dependent on the effective and continuous removal of excess heat therefrom.

However, an effective shock and vibration isolator of the type described in the above-mentioned patents is not an effective heat dissipator. Stainless steel, as well as many other metals, is a relatively poor conductor of heat, when compared to such materials as copper. However, copper, being a malleable material, is not a good choice for damping shock and vibration forces, since copper wire will eventually crack when subjected to repeated flexing.

U.S. Pat. No. 4,789,023 proposed a vibration isolator that also acted as a heat sink. Heat removal was achieved by a heat pipe wherein a working fluid such as methyl alcohol was contained between outer and inner flexible, tubular enclosures and was conveyed from a condenser section to an evaporator section of the heat pipe. The fluid was converted to vapor and then re-liquefied. Such fluid flow systems were not only subject to fluid leakage, but were also not altogether satisfactory in removing waste heat. In any event, the need also sometimes exists for conducting electricity away from such load structures and, in such cases, heat pipe systems cannot conduct electricity away from the load structure.

SUMMARY OF THE INVENTION

1. Objects of the Invention

It is a general object of this invention to advance the state of the art of force-damping isolators.

It is another object of this invention to provide an isolator that is effective not only as a shock and vibration force damper, but also as a heat dissipator and as a conductor of electricity.

Another object of this invention is to provide a compact isolator that is rugged in construction and durable in operation.

Still another object of this invention is to provide a compact isolator of reduced length, but having the same shock and vibration force damping characteristic, as compared to known isolators having a greater length dimension.

2. Features of the Invention

In keeping with these objects, and others which will become apparent hereinafter, one feature of this invention resides, briefly stated, in a force-damping energy-removing isolator for resisting transmission of shock and vibration forces between structures, at least one of which emits energy. For example, one of the structures may be an equipment cabinet containing heat- and/or electricity-generating components, and the other of the structures may be a moving vehicle that is subject to shock and vibration forces.

The isolator comprises a pair of isolator supports, each extending along a longitudinal direction, and connectable to a respective structure. The supports are spaced apart at a distance along a transverse direction generally normal to the longitudinal direction.

Spring means are provided for resisting transmission of shock and vibration forces between the structures, and include flexural elements spaced apart of each other along a longitudinal direction and bounding open spaces therebetween. Each flexural element is constituted of a resilient material, and spans the distance between the supports.

The isolator further comprises conductor means independent of the spring means, and operative for conducting energy away from said at least one structure which emits energy. The conductor means includes conductor elements spaced apart of each other along the longitudinal direction, and bounding open spaces therebetween. Each conductor element is constituted of an energy-conducting material, and spans the distance between the supports.

In a preferred embodiment, the resilient material for the flexural elements is a metal wire, such as stainless steel, that is capable of being repeatedly flexed without breaking. The energy-conducting material is a heat-conducting, as well as an electrical current-conducting, material such as beryllium copper.

The flexural elements and the conductor elements may be individual arched elements, each of whose opposite ends are respectively secured to the supports, or individual annular elements, each having arc-shaped end portions spanning the distance between the supports. Alternatively, the flexural elements may be wound in one circumferential direction about a longitudinal axis midway between the supports to form coils of a predetermined diameter, and the conductor elements may be wound about the same longitudinal axis in the opposite circumferential direction to form coils having the same diameter as said predetermined diameter. In another modification, the flexural and the conductor elements have annular shapes and are arranged in pairs in common planes lying in the transverse direction. Each pair includes one of the flexural elements having a predetermined circumference, and one of the conductor elements having a circumference greater than said predetermined circumference.

Thus, the flexural elements act to damp shock and vibration forces between the structures while the conductor elements act to dissipate heat and/or to conduct electricity away from said one structure which emits such energy.

Still another aspect of this invention relates to rendering the isolator compact along the longitudinal direction, which is of particular benefit when longitudinal space is at a premium. Thus, the compact isolator comprises spring means including a plurality of first flexural elements, and another plurality of second flexural elements. The first flexural elements at least partly surround the second flexural elements. Hence, increased compression of the flexural elements is achieved by positioning the first flexural elements around the second flexural elements—all without adding to the overall length of the isolator.

In the preferred embodiment of the compact isolator, the flexural elements are annular and are arranged in pairs in common planes lying in the transverse direction. Each pair includes one of the first flexural elements having a predetermined circumference, and one of the second flexural elements having a circumference smaller than said predetermined circumference.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
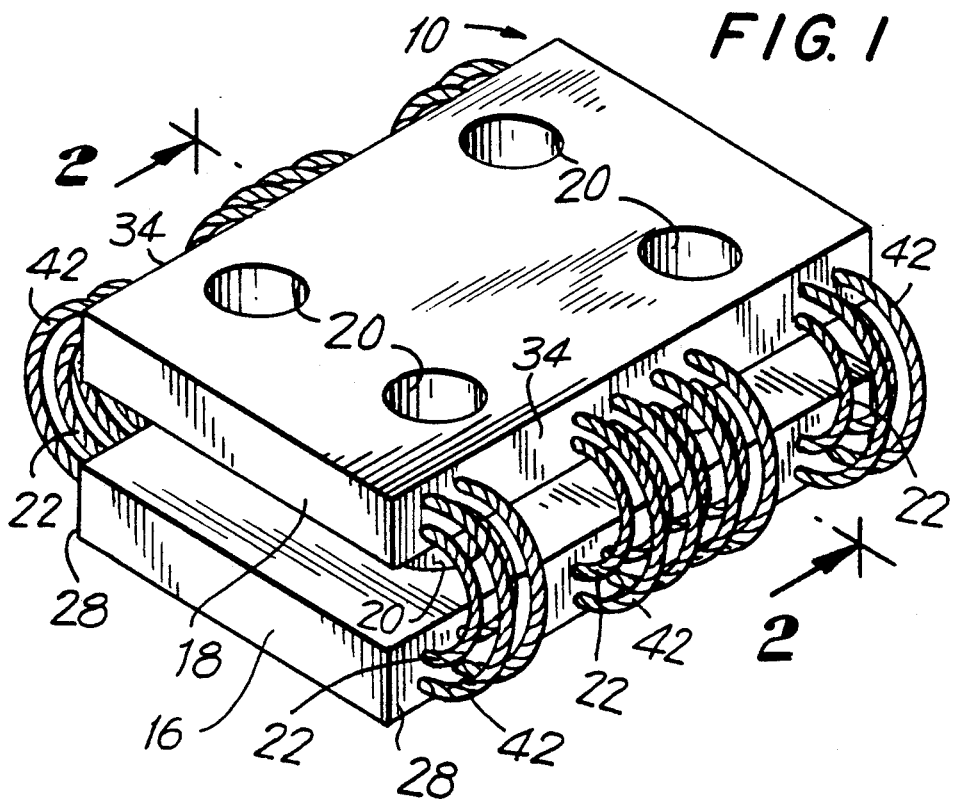
FIG. 1 is a perspective view of one embodiment of an isolator according to this invention.
Figure 2:
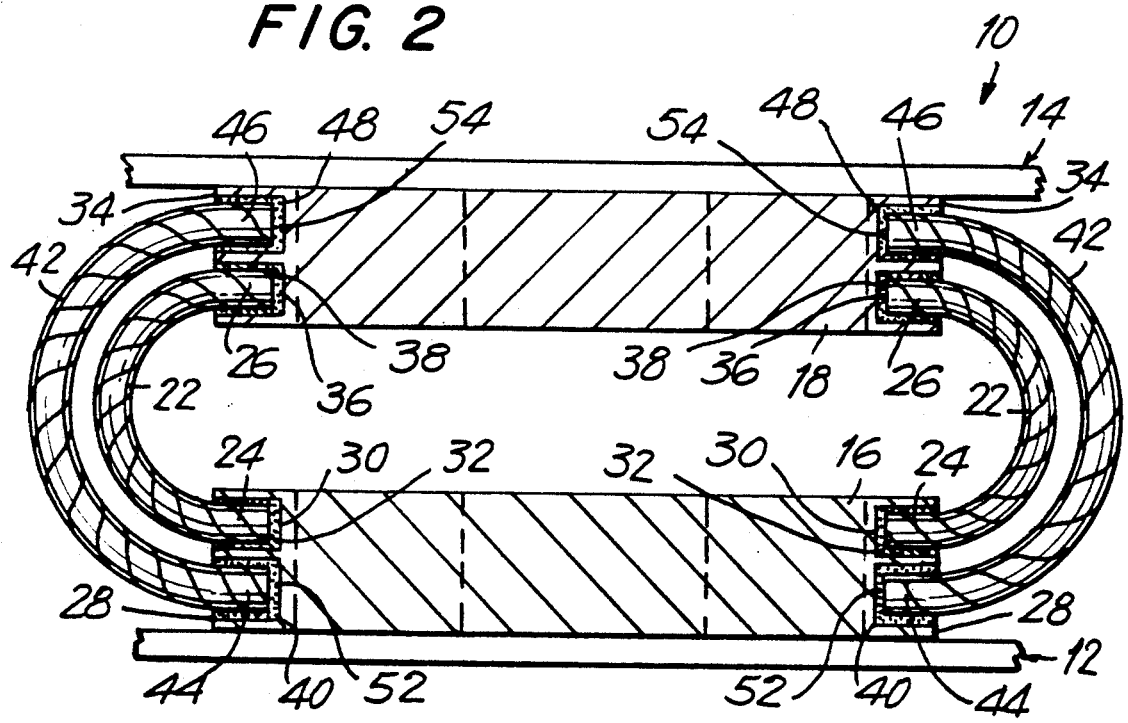
FIG. 2 is a sectional view taken on line 2—2 of FIG. 1, the isolator being shown connected to brokenaway structures in use.

Referring now to the embodiment of FIGS. 1 and 2, reference numeral 10 generally identifies an isolator operative for resisting transmission of shock and vibration forces between structures. Structure 12 is subject to shock and vibration and may, for example, be a floor of a vehicle. Structure 14 is a load and may, for example, be an equipment cabinet containing electrical or electro-mechanical components that generate energy such as heat and/or electricity, and convey this energy to the cabinet. Structure 14 may be the actual components themselves. During operation of the components, heat is unavoidably generated, and it is desirable to remove this excess heat to insure continued efficient operation. Electrical current may also be generated by the components, e.g. during a short circuit condition, and to insure safety, it is desirable to convey this electrical current away from the components. The various embodiments of the isolator disclosed herein provide both shock and vibration force damping as well as heat and/or electrical current removal.

Isolator 10 includes a pair of plate-shaped supports 16, 18, each extending in mutual parallelism along the longitudinal direction. Each support 16, 18 has a plurality of holes 20 extending therethrough for connecting a respective support to a respective structure by means of a non-illustrated elongated fastener such as a threaded bolt which extends through a respective hole 20. Other fasteners are contemplated by this invention.

Spring means are operative for resisting transmission of shock and vibration forces between the structures and, in turn, between the supports 16, 18. In the embodiment of FIGS. 1 and 2, the spring means includes a plurality of arched, individual, flexural elements 22, each having one end 24 secured to support 16, and an opposite end 26 secured to support 18. Support 16 has opposite side walls 28 through which a plurality of blind bores 30 extend for a limited distance. Each flexural element end 24 is secured in a respective bore 30 by an adhesive 32, or by staking, or by any other suitable means for anchoring each element end 24 in each bore 30. Analogously, support 18 has opposite side walls 34 through which a plurality of blind bores 36 extend for a limited distance. Each flexural element end 26 is secured in a respective bore 36 by an adhesive 38, or by staking, or by any other suitable anchoring means.

The flexural elements 22 are successively arranged, one after another, in a row along the longitudinal direction on each side of the isolator. The bores 30 and 36 are also arranged in respective linear rows along the longitudinal direction on each support 16, 18. The flexural elements 22 are constituted of a resilient material, and span the distance between the side walls 28, 34 of the supports 16, 18 along respective arcuate semi-circular paths. The flexural elements 22 are tensioned and, after being flexed, inherently return to a rest position shown in solid lines in FIG. 2. The flexural elements 22 are preferably constituted of stainless steel, either fabricated as a single wire, or preferably fabricated as multiple wires wound and braided into a rope. The flexural elements 22 bound open spaces with one another and are directly exposed to the environment so as to have multiple freedoms of movement during flexing away from, and during return to, the rest position.

Independently operative of the spring means, the isolator also comprises conductor means operative for conducting energy away from the structure 14 that emits energy. In the embodiment of FIGS. 1 and 2, the conductor means includes a plurality of arched, individual, conductor elements 42, each having one end 44 secured to the support 16, and an opposite end 46 secured to the support 18. A plurality of blind bores 40 extend for a limited distance through each side wall 28 of the support 16.

Each conductor element end 44 is secured in a respective bore 40 by an adhesive 52, or by staking, or by any other suitable anchoring means. Analogously, an auxiliary plurality of blind bores 48 extend for a limited distance through each side wall 34 of the support 18. Each conductor element end 46 is secured in a respective bore 48 by an adhesive 54, or by staking, or by any other suitable anchoring means.

The conductor elements 42 are successively arranged, one after another, in respective rows along the longitudinal direction on each side of the isolator. The bores 40, 48 are also arranged in respective linear rows along the longitudinal direction on each support 16, 18. The conductor elements 42 are constituted of an energy-conducting material and span the distance between the side walls 28, 34 of the supports 16, 18 along arcuate, semi-circular paths. The conductor elements 42 may be constituted of a solid metallic core of beryllium copper, or preferably is a multi-wire braided rope. The conductor elements 42 bound open spaces with one another, and can not only directly convey heat away from the heat-generating structure 14, but also can effectively radiate heat to the ambient environment.

The flexural elements 22 are more interiorly located than the conductor elements 42, and have a smaller radius of curvature and circumference. The bores 30, 40 in the support 16 are aligned with each other in a vertical plane, and are also aligned in the same vertical plane with the bores 36, 48 in the support 18. At least one of the flexural elements 22 and at least one of the conductor elements 42 form a pair on each lateral side of the isolator. Each such pair lies in a common vertical plane, and all the planes for the other pairs are spaced apart of one another along the longitudinal direction.

Figure 3:
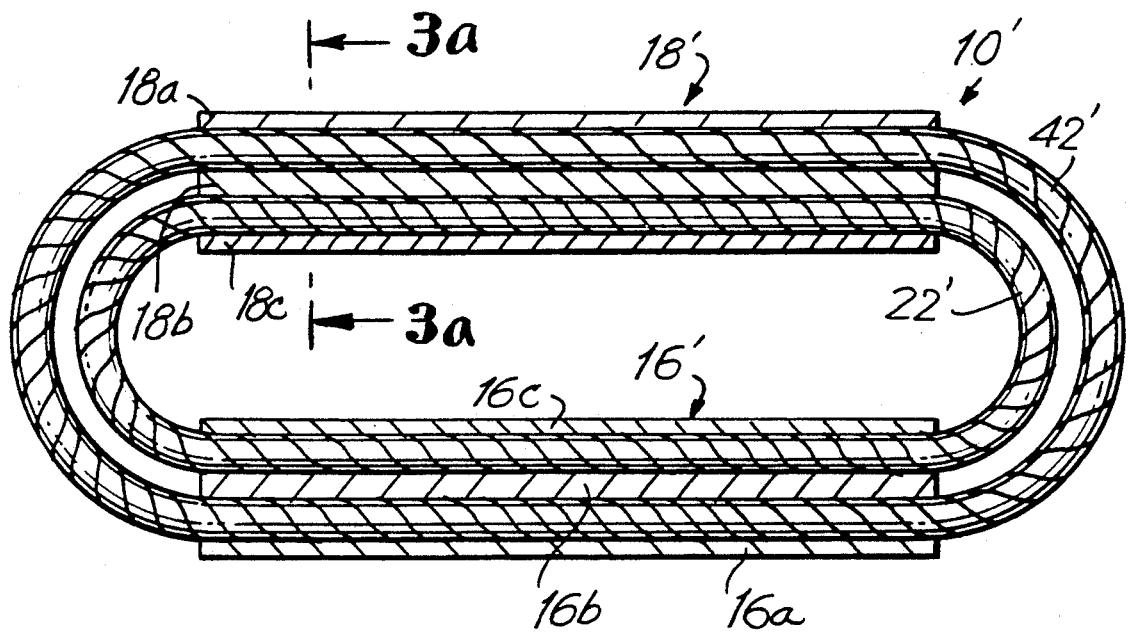
FIG. 3 is a view analogous to FIG. 2, but of another embodiment of an isolator according to this invention, and with the structures omitted for clarity.
Figure 3A:
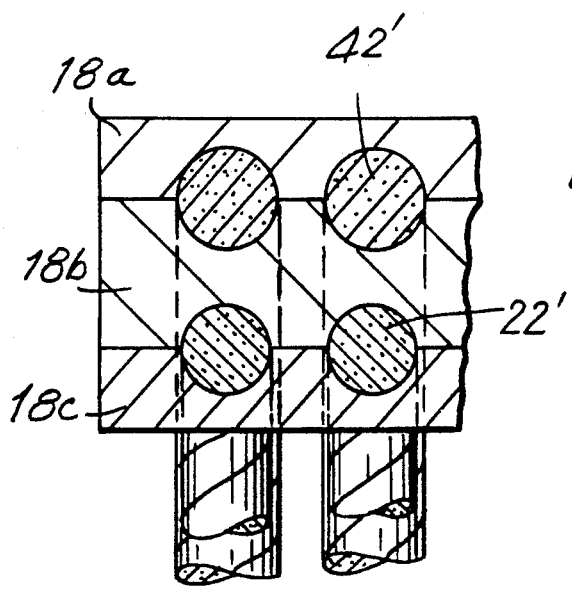
FIG. 3a is a sectional viewtaken on line 3a—3a of FIG. 3.

FIG. 3 depicts a modified isolator 10'. The flexural elements and the conductor elements are not circumferentially incomplete arches as depicted in FIG. 2, but, instead, are circumferentially complete rings 22', 42'. The circumference of each flexural element 22' is smaller than the circumference of the corresponding conductor element 42' of each pair. In order to mount the annular flexural and conductor elements 22', 42', the plate-shaped support 16' is subdivided into three sections 16a, 16b, 16c, and the plate-shaped support 18' is subdivided three sections 18a, 18b, 18c (see FIG. 3a). The sections are detachably separable from the others along parting lines that bisect the bores through which the flexural and conductor elements extend in the supports 16', 18'.

Figure 4:
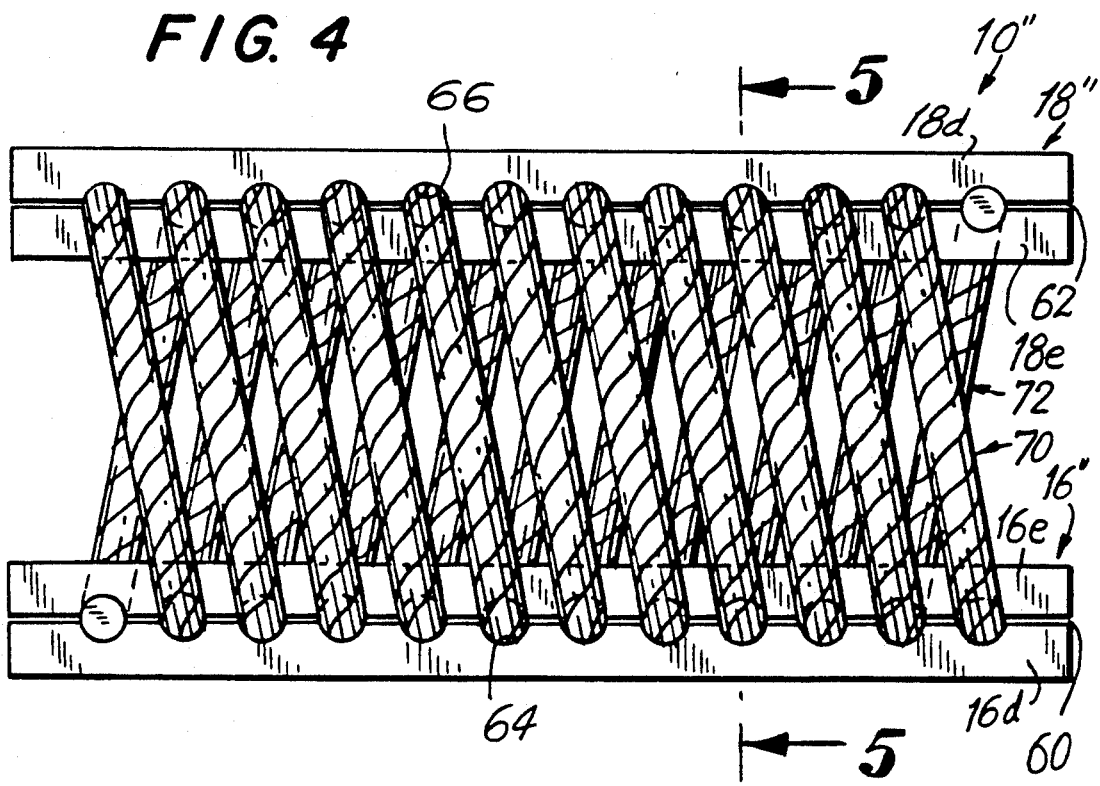
FIG. 4 is a side view of yet another embodiment of an isolator according to this invention.
Figure 5:
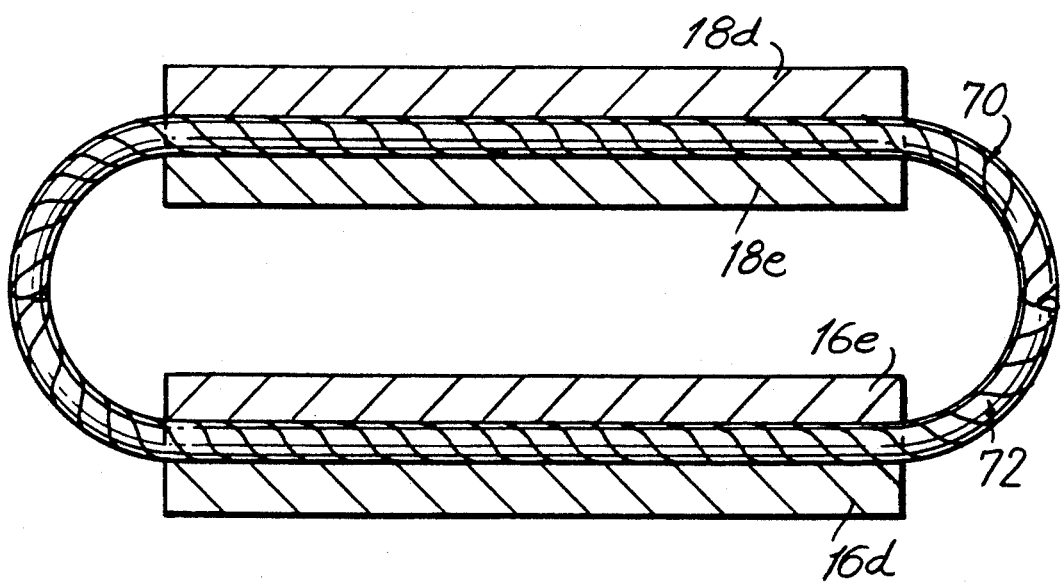
FIG. 5 is a broken-away sectional view taken on line 5—5 of FIG. 4.

FIGS. 4 and 5 depict another modified isolator 10'' having a pair of supports 16'', 18''. The support 16'' is subdivided along a parting line 60 into two sections 16d, 16e, and the support 18'' is subdivided along parting line 62 into two sections 18d, 18e. A plurality of channels 64 in support 16'', each having a circular cross-section, is successively arranged along the longitudinal direction. Each channel 64 is bisected by the parting line 60. A plurality of additional channels 66 is provided in support 18'', each channel having a circular cross-section, and all the channels 66 being arranged along the longitudinal direction. Each channel 66 is bisected by the parting line 62.

Rather than forming the flexural elements and the conductor elements as a plurality of individual, arch-shaped elements as in FIG. 2, or as a plurality of annular, ring-shaped elements as in FIG. 3, the isolator 10'' of FIGS. 4 and 5 forms the flexural elements as a one-piece first winding 70, and forms the conductor elements as a one-piece second winding 72.

In the preferred embodiment, the winding 70 is wound helically in one circumferential direction about a longitudinal axis located midway between the supports. The winding 72 is wound helically in the opposite circumferential direction about the longitudinal axis. The windings 70, 72 have opposite pitches. As illustrated in FIG. 4 and 5, the windings 70, 72 have coils of the same diameter. However, it is also contemplated that the windings 70, 72 be formed with coils of different diameter, in which case, it is preferred that the winding 70, which performs the shock-absorbing function, have the smaller diameter coils, whereas, the winding 72, which performs the energy-removing function, have the greater diameter coils. As shown in FIG. 4, the winding 70 is wound through every other channel 64 and every other channel 66. The same is true for the winding 72, which is wound through every other channel 64 and every other channel 66.

If the elements 42, 42' in FIGS. 2,3 were constituted of the same resilient material, e.g. stainless steel, as the elements 22, 22', then the resulting isolator would have a shock and vibration force damping characteristic approximately equivalent to twice that of an isolator having a single row of flexural elements. The same is true for the embodiment of FIGS. 4 and 5 where the diameter of the coils of the winding 70 is smaller than the diameter of the coils of the winding 72.

Thus, a longitudinally compact isolator is obtained, which is of special benefit when longitudinal space is at a premium, all without sacrificing the damping characteristic. Isolators can now have an increased damping characteristic per unit length.

It will be understood that each of the elements described above, or two or more together, also may find a useful application in other types of constructions differing from the types described above.

While the invention has been illustrated and described as embodied in a force-damping energy-removing isolator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A force-damping, energy-removing isolator for resisting transmission of shock and vibration forces between structures, at least one of which emits energy, said isolator comprising:
 (a) a pair of isolator supports, each extending along a longitudinal direction and connectable to a respective structure, said supports being spaced apart at a distance along a transverse direction generally normal to the longitudinal direction;
 (b) spring means for resisting transmission of shock and vibration forces between the structures, including flexural elements spaced apart of each other along the longitudinal direction and bounding open spaces between the flexural elements, each flexural element being constituted of a resilient material and spanning the distance between the supports;
 (c) conductor means independent of the spring means, and operative for conducting energy away from said at lest one structure which emits energy, including conductor elements spaced apart of each other along the latitudinal direction and bounding open spacers between the conductor elements, each conductor element being constituted of an energy-conducting material and spanning the distance between the supports; and
 (d) said resilient material and said energy-conducting material being different in resilience and energy conductance, said resilient material having a greater resilience than said energy-conducting material to resist said transmission of forces, said energy-conducting material having a greater energy conductance than said resilient material to conduct said energy away from said at least on structure.

2. The isolator as claimed in claim 1, wherein the flexural elements are individual, arched, tensioned elements having opposite ends respectively secured to the supports.

3. The isolator as claimed in claim 1, wherein the conductor elements are individual, arched element having opposite ends respectively secured to the supports.

4. The isolator as claimed in claim 1, wherein the flexural elements re individual, annular, tensioned elements, each having arc-shaped portions spanning the distance between the supports.

5. The isolator as claimed in claim 1, wherein the conductor elements re individual, annular elements, each having arch-shaped portions spanning the distance between the supports.

6. The isolator as claimed in claim 1, wherein the flexural elements and the conductor elements re individual, annular elements arranged in pair in common planes lying in the transverse direction, each pair including one of the flexural elements having a predetermined circumference and one of the conductor elements having a circumference greater than said predetermiend circumference.

7. The isolator as claimed in claim 1, wherein the flexural elements are wound about a longitudinal axis midway between the supports to form coils of a predetermiend diameter, and wherein the conductor elements are wound about the same longitudinal axis to form coils having the same diameter as said predetermined diameter.

8. The isolator as claimed in claim 7, wherein the flexural elements are wound in one circumferential direction about the longitudinal axis, and wherein the conductor elements are wound in an opposite circumferential direction about the longitudinal axis.

9. The isolator as claimed in claim 1, wherein the resilient material for the flexural elements is a metal wire.

10. The isolator as claimed in claim 9, wherein the metal wire is constituted of a stainless steel.

11. The isolator as claimed in claim 1, wherein the energy-conducting material is a heat-conducting material.

12. The isolator as claimed in claim 1, wherein the energy-conducting material is an electrical current-conducting material.

13. The isolator as claimed in claim 1, wherein the energy-conducting material is a malleable material.

14. The isolator as claimed in claim 1, wherein the energy-conducting material is beryllium copper.

* * * * *